United States Patent
Sarokhan

(10) Patent No.: US 10,938,232 B2
(45) Date of Patent: Mar. 2, 2021

(54) HIGH DC VOLTAGE TO LOW DC VOLTAGE CONVERSION APPARATUS INCLUDING RECHARGEABLE BATTERIES

(71) Applicant: Ocean Power Technologies, Inc., Pennington, NJ (US)

(72) Inventor: Joseph Sarokhan, Basking Ridge, NJ (US)

(73) Assignee: OCEAN POWER TECHNOLOGIES, INC., Monroe Township, NJ (US)

( * ) Notice: Subject to any disclaimer, the term of this patent is extended or adjusted under 35 U.S.C. 154(b) by 116 days.

(21) Appl. No.: 16/348,668

(22) PCT Filed: Nov. 10, 2017

(86) PCT No.: PCT/US2017/061082
§ 371 (c)(1),
(2) Date: May 9, 2019

(87) PCT Pub. No.: WO2018/089778
PCT Pub. Date: May 17, 2018

(65) Prior Publication Data
US 2019/0273388 A1    Sep. 5, 2019

Related U.S. Application Data

(60) Provisional application No. 62/420,331, filed on Nov. 10, 2016.

(51) Int. Cl.
*H02J 7/04* (2006.01)
*H02J 7/16* (2006.01)
*H02J 7/14* (2006.01)

(52) U.S. Cl.
CPC .......... *H02J 7/1415* (2013.01); *H02J 7/1423* (2013.01); *H02J 7/1438* (2013.01); *H02J 7/1461* (2013.01); *H02J 7/1492* (2013.01)

(58) Field of Classification Search
CPC ...................................... H02J 7/1415
USPC ......................................... 320/140
See application file for complete search history.

(56) References Cited

U.S. PATENT DOCUMENTS

| | | |
|---|---|---|
| 5,701,068 A | 12/1997 | Baer et al. |
| 6,528,928 B1 | 3/2003 | Burns et al. |
| 7,248,020 B2 * | 7/2007 | Hidaka ............. G01R 31/3835 320/134 |
| 7,397,152 B2 | 7/2008 | Stewart et al. |
| 8,723,355 B2 | 5/2014 | Eder et al. |
| 8,976,034 B2 | 3/2015 | Yoo |
| 9,945,348 B2 | 4/2018 | Sarokhan |
| 2008/0212345 A1 * | 9/2008 | Yamashita ........ H02J 7/007192 363/50 |

(Continued)

OTHER PUBLICATIONS

PCT International Search Report and Written Opinion dated Jan. 23, 2018 for WO Patent Application No. PCT/US2017/061082, 9 pages.

*Primary Examiner* — Yalkew Fantu
(74) *Attorney, Agent, or Firm* — Jonathan Pierce; Pierre Campanac; Porter Hedges LLP

(57) ABSTRACT

A buffered power transfer apparatus includes rechargeable batteries. The buffered power transfer apparatus is used on demand to convert high voltage DC to low voltage DC at maximum efficiency with minimum standby losses. The buffered power transfer apparatus may be used in a Wave Energy Converter.

12 Claims, 4 Drawing Sheets

(56) References Cited

U.S. PATENT DOCUMENTS

| | | | |
|---|---|---|---|
| 2013/0169212 A1* | 7/2013 | Sun | H02M 3/33592 |
| | | | 320/103 |
| 2014/0084843 A1* | 3/2014 | Pham | B60L 58/21 |
| | | | 320/103 |
| 2014/0184142 A1* | 7/2014 | Bito | B60L 58/12 |
| | | | 320/104 |
| 2016/0131709 A1* | 5/2016 | Yoo | G01R 31/2834 |
| | | | 324/762.01 |

* cited by examiner

HIGH DC VOLTAGE TO LOW DC VOLTAGE CONVERSION APPARATUS INCLUDING RECHARGEABLE BATTERIES

This application is a U.S. national stage application under 35 U.S.C. § 371 of PCT Application No. PCT/US2017/061082, filed on Nov. 10, 2017, which claims priority to U.S. Provisional Application Ser. No. 62/420,331, filed on Nov. 10, 2016. Application No. PCT/US2017/061082 and Provisional Application Ser. No. 62/420,331 are incorporated by reference herein for all purposes.

BACKGROUND

This disclosure relates to apparatus and method for the efficient and reliable conversion of a high voltage direct current (HVDC) to a low voltage direct current (LVDC).

By way of example, as shown in FIG. 1, a prior electrical system for a Wave Energy Converter ("WEC") includes an electric generator G which produces a varying AC voltage $V_{AC}$. The varying AC voltage $V_{AC}$ may typically have a high peak amplitude. This varying AC voltage $V_{AC}$ is usually applied to an AC to DC converter 127 to produce a high DC voltage HVDC, which by way of example may be 325 volts. The high DC voltage HVDC is then coupled to various high voltage DC loads (e.g., 119) to provide them with electrical power. Also, the high DC voltage HVDC is usually coupled to a DC to DC converter 121 to generate a low DC voltage LVDC, which by way of example may be 24 volts. The low DC voltage LVDC may be carried on a low DC voltage bus 122. The output of the DC to DC converter 121 may be applied to a storage battery 123, and to various low voltage DC loads 125, which may include sensing, processing, and control electronics, or other devices.

It is often necessary to continuously provide electrical power to the various low voltage DC loads 125 such as when the various low voltage DC loads 125 include low voltage control electronics for the DC to DC converter 121. So, in the prior electrical system of FIG. 1, the DC to DC converter 121 needs to be turned on or activated all the time to ensure that the various low voltage DC loads 125 have their required electrical power. Further, the DC to DC converter 121 has to be designed to meet the maximum electrical power drawn by the various low voltage DC loads 125. When electrical power levels close to the maximum electrical power are drawn, the DC to DC converter 121 is efficient (e.g., 90% efficient). A problem is that, when electrical power levels much lower than the maximum electrical power are typically drawn, the efficiency of the DC to DC converter 121 is much less (e.g., 35% efficient). Thus, under light loading conditions on the low voltage DC bus 122, the standby power losses in the DC to DC converter 121 can significantly reduce the efficiency of the prior electrical system of FIG. 1.

Thus, there is a continuing need in the art for methods and apparatus for the efficient and reliable conversion of a high voltage direct current (HVDC) to a low voltage direct current (LVDC). It is an object of the disclosure to describe ways to resolve the inefficient operation of the prior electrical system described in FIG. 1.

BRIEF SUMMARY OF THE DISCLOSURE

An apparatus for converting high DC voltage to low DC voltage comprises a battery charger module. The battery charger module includes a DC to DC converter. The DC to DC converter has a high voltage input and a low voltage output. The DC to DC converter does not generate power loss when the rechargeable battery module is deactivated. An electrical power capacity of the DC to DC converter may be strictly lower than the peak electrical power of a low voltage load connected to a rechargeable battery module connected to the low voltage output of the battery charger module.

The apparatus further comprises the rechargeable battery module mentioned above. The rechargeable battery module is connected to the low voltage output of the battery charger module. The rechargeable battery module includes a low voltage battery. The low voltage battery may include a lithium-ion battery. The rechargeable battery module also includes a sensor capable of generating a signal indicative of a state of charge of the low voltage battery. The sensor capable of generating the signal indicative of the state of charge of the low voltage battery may include a current sensor.

The apparatus further comprises a control system. The control system may be continuously powered from the rechargeable battery module. The control system receives the signal indicative of the state of charge of the low voltage battery. The control system generates a control signal to the rechargeable battery module. The control system is configured to activate the battery charger module, with the control signal, upon detecting that the state of charge of the low voltage battery is below a first predetermined threshold. The control system is also configured to deactivate the battery charger module, with the control signal, upon detecting that the state of charge of the low voltage battery is above a second predetermined threshold. The second predetermined threshold is larger than the first predetermined threshold. The control system may include integration circuitry to continually sum the signal generated by the current sensor provided in the rechargeable battery module. The control system may alternatively include a processor programmed to continually sum the signal generated by the current sensor provided in the rechargeable battery module.

The apparatus may further comprise a low voltage load connected to the rechargeable battery module. The low voltage load may consume a variable electrical power characterized by a peak electrical power that is higher than an average electrical power.

The apparatus may further comprise an electric generator. The electric generator may produces a varying AC voltage from wave energy.

The apparatus may further comprise an AC to DC converter. The AC to DC converter may be connected to the electric generator.

The apparatus may further comprise a high voltage storage element. The high voltage storage element may include a high voltage battery. The high voltage battery may be connected to the AC to DC converter. The high voltage battery may also be connected to the high voltage input of the battery charger module.

A method may comprise producing, with an electric generator, a varying AC voltage from wave energy.

The method may further comprise converting the varying AC voltage to a DC voltage using an AC to DC converter connected to the electric generator.

The method may further comprise charging a high voltage battery included in a high voltage storage element that is connected to an output of the AC to DC converter.

The method may further comprise supplying current from the high voltage battery included in the high voltage storage element to an input of a battery charger module.

The method comprises converting high DC voltage to low DC voltage with a DC to DC converter included in the battery charger module, wherein the DC to DC converter does not generate power loss when the rechargeable battery module is deactivated. The method may further comprise producing, with the DC to DC converter, an electrical power that is strictly lower than a peak electrical power of a low voltage load connected to a rechargeable battery module.

The method further comprises recharging, with the low DC voltage, a low voltage battery included in the rechargeable battery module.

The method further comprises generating a signal indicative of a state of charge of the low voltage battery with a sensor included in the rechargeable battery module. Generating the signal indicative of the state of charge of the low voltage battery may include measuring a current flow to the low voltage battery. The method may further comprise continually summing the current flow to determine the state of charge of the low voltage battery.

The method further comprises using a control system to receive the signal indicative of the state of charge of the low voltage battery and to generate a control signal to the rechargeable battery module based on the signal indicative of the state of charge of the low voltage battery.

The method further comprises activating the battery charger module upon detecting that the state of charge of the low voltage battery is below a first predetermined threshold.

The method further comprises deactivating the battery charger module upon detecting that the state of charge of the low voltage battery is above a second predetermined threshold, wherein the second predetermined threshold is larger than the first predetermined threshold.

The method may further comprise continuously powering the control system from the rechargeable battery module.

The method may further comprise consuming a variable electrical power with a low voltage load connected to the rechargeable battery module, wherein the low voltage load is characterized by a peak electrical power that is higher than an average electrical power.

BRIEF DESCRIPTION OF THE DRAWINGS

For a more detailed description of the embodiments of the disclosure, reference will now be made to the accompanying drawings, wherein.

DETAILED DESCRIPTION

Figure 1:
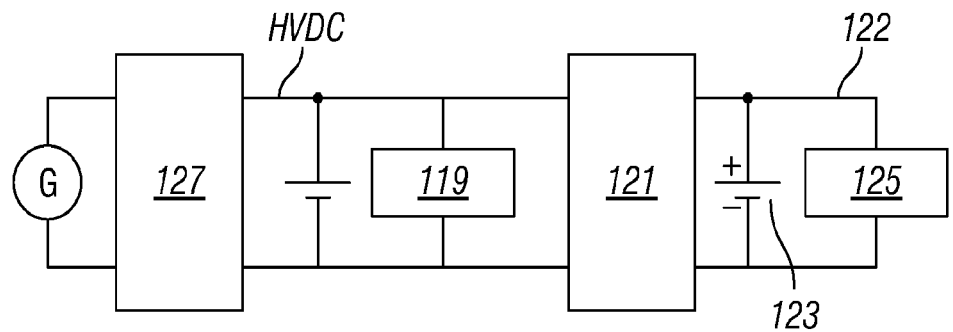
FIG. 1 is a block diagram of an electrical conversion apparatus illustrative of the prior art.

It is to be understood that the following disclosure describes several exemplary embodiments for implementing different features, structures, or functions of the invention. Exemplary embodiments of components, arrangements, and configurations are described below to simplify the disclosure; however, these exemplary embodiments are provided merely as examples and are not intended to limit the scope of the invention. Additionally, the disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Finally, the exemplary embodiments presented below may be combined in any combination of ways, i.e., any element from one exemplary embodiment may be used in any other exemplary embodiment, without departing from the scope of the disclosure.

All numerical values in this disclosure may be exact or approximate values unless otherwise specifically stated. Accordingly, various embodiments of the disclosure may deviate from the numbers, values, and ranges disclosed herein without departing from the intended scope. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function.

In accordance with the disclosure, what is referred to herein as a rechargeable battery module (e.g., including a battery having characteristics similar to rechargeable lithium-ion batteries) is connected to the output of a battery charger module. The battery charger module is operated to be fully turned on or fully turned off. When fully turned on, the battery charger module is operated close to its maximum efficiency level. When fully turned off, the battery charger module dissipates essentially no energy. Preferably, the rechargeable battery module can supply the electrical power needed to operate the largest instantaneous loads. The state of charge of the rechargeable battery is monitored such that, when the level of charge of the rechargeable battery is below a predetermined threshold, the battery charger module is turned fully on, and when the level of charge of the rechargeable battery is above another, higher, predetermined threshold, the battery charger module is turned fully off. The rechargeable battery module may be characterized as having a relatively constant output voltage as long as the rechargeable battery module is charged at a sufficient level. The predetermined threshold at which the battery charger module is turned fully on is preferably higher than the level at which the output voltage of the rechargeable battery module decreases. For example, when the output voltage of the rechargeable battery is relatively constant as long as the rechargeable battery is charged at a level more than 20% to 30% of its capacity, the predetermined threshold to turn the battery charger module fully on may be selected to be approximately 50%.

Figure 2:
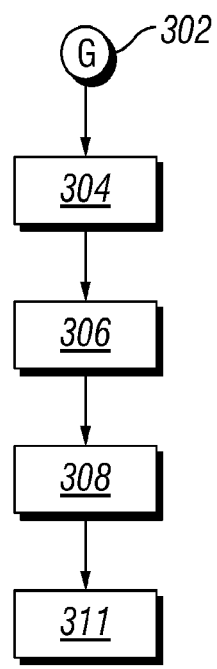
FIG. 2 is a block diagram of a simplified electrical conversion apparatus in accordance with the disclosure, wherein the electrical conversion apparatus allows for buffered power transfer.
Figure 3:
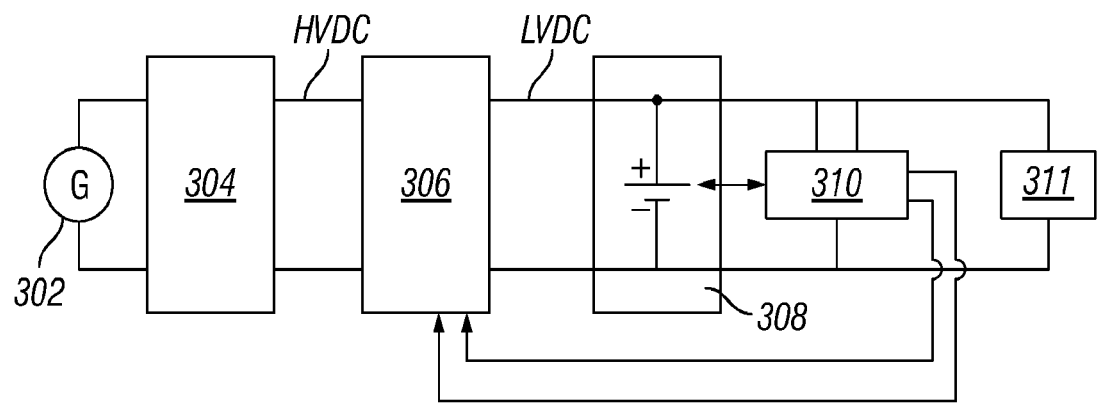
FIG. 3 is a block diagram of an electrical conversion apparatus in accordance with the disclosure, wherein the electrical conversion apparatus comprises a rechargeable battery module and a battery charger module.

Referring initially to FIGS. 2 and 3, there is shown a Wave Energy Converter that comprises a generator 302 that produces an AC voltage $V_{AC}$ from wave energy. The AC voltage $V_{AC}$ may vary over a wide range of values depending on the waves. The AC voltage $V_{AC}$ is applied to an AC to DC converter 304 to produce a high DC voltage HVDC. In FIG. 2 or 3, for the purpose of illustration, this high DC voltage HVDC is shown, for example, to have a value of 325 volts. This value may be lower or considerably higher.

In accordance with the present disclosure, a buffered power transfer apparatus is used to convert the high DC voltage HVDC from the output of the AC to DC converter 304 to low DC voltage LVDC for use by a variety of different devices. In FIG. 2 or 3, for the purpose of illustration, this low DC voltage LVDC is shown, for example, to have a value of 24 volts. While the buffered power transfer apparatus shown in FIGS. 2 and 3 is applied to a Wave Energy Converter including the generator 302 and the AC to DC converter 304, the buffered power transfer apparatus may alternatively be applied to other high DC voltage sources.

The buffered power transfer apparatus includes a battery charger module 306 having a high voltage input and a low voltage output. The battery charger module 306 may include, for example, a DC to DC converter. The battery charger module 306 is used to charge a rechargeable battery module 308. The rechargeable battery module 308 powers a control system 310 that controls operation of the battery charger module 306. The rechargeable battery module 308 may also serve as a buffer to supply large peak electrical powers.

Figure 3A:
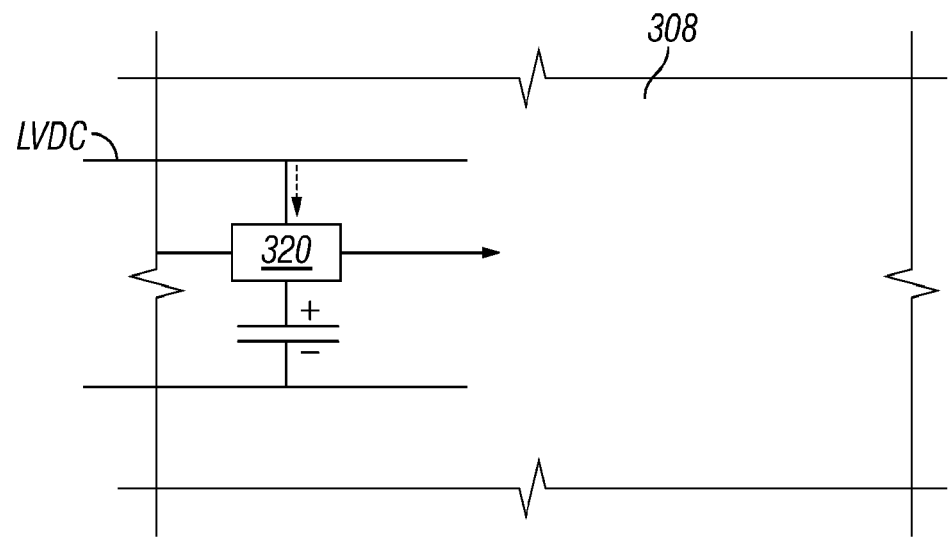
FIG. 3A is a block diagram of the rechargeable battery module shown in FIG. 3, wherein the rechargeable battery module includes a state of charge sensor.

Turning to FIGS. 3 and 3A, the rechargeable battery module 308 may include a battery generating a relatively constant voltage as long as its state of charge is above some level (e.g., 20% to 30%). For example, the rechargeable battery module 308 may include a lithium-ion battery. As shown in FIG. 3A, a sensor 320 may be provided to sense the state of charge of the battery and produce signals which are transmitted to the control system 310. The control system 310 is programmed to control the turning on and turning off of the battery charger module 306. The sensor 320 is illustrated in FIG. 3A with a symbolic representation and may take many different forms as discussed below.

The buffered power transfer apparatus can supply electrical power to the low voltage loads 311. By way of example, the control system 310 can operate with electrical power drawn from the rechargeable battery module 308 for dozens of hours at a time before a recharge of the rechargeable battery module 308 is required. When the state of charge of the rechargeable battery module 308 falls below a predetermined threshold (e.g., 50%), the battery charger module 306 may be activated by the control system 310. The battery charger module 306 may then recharge the battery charger module 306 using electric electrical power drawn from the high voltage bus (HVDC). When recharging, the battery charger module 306 operates at a high-efficiency operating point. The battery charger module 306 is kept on until the state of charge of the rechargeable battery module 308 exceeds another predetermined threshold (e.g., 90%). Once the rechargeable battery module 308 has been recharged, the battery charger module 306 is turned off, eliminating or significantly reducing standby power losses. Thus, the buffered power transfer apparatus disclosed herein allows electrical power to be converted from the high voltage bus to the low voltage bus at maximum efficiency and with essentially zero standby power losses when deactivated, while still allowing large peak electrical powers to be momentarily drawn.

Since the peak electrical powers are buffered by the rechargeable battery module 308, the battery charger module 306 only needs to support a long-term average loading. Accordingly, the power rating of the battery charger module 306 can be greatly reduced from the maximum electrical power drawn by the low voltage loads 311 and/or the control system 310. The peak to average operating power ratio of the battery charger module 306 is relatively low, increasing the overall efficiency of the buffered power transfer system.

Figure 4:
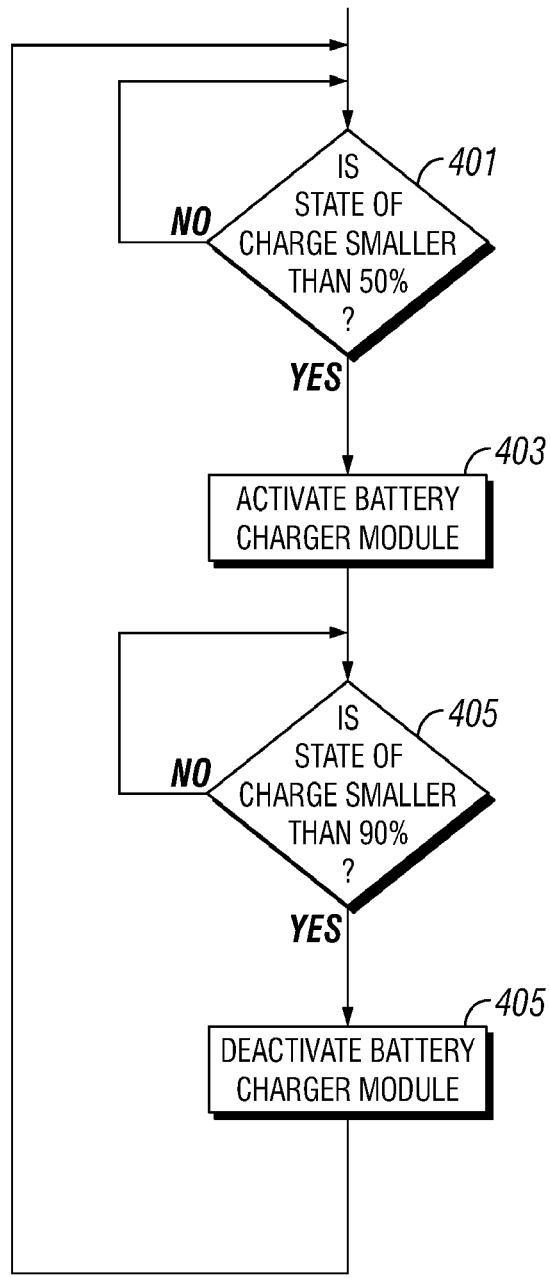
FIG. 4 is a flowchart of a process for operating the DC to DC converter shown in the battery charger module of FIG. 3.

FIG. 4 is a highly simplified flowchart illustrating the basic programming to determine when the battery charger module 306 is turned on to recharge the rechargeable battery module 308. At step 401, circuitry (e.g., including the sensor 320 shown in FIG. 3A) senses whether the state of charge of the battery included in the rechargeable battery module 308 is smaller than a predetermined threshold, for example, 50%. If yes, step 403 is initiated to turn on the battery charger module 306 to charge the battery included in the rechargeable battery module 308. As such, the low voltage loads 311 and the control system 310 are powered by a combination of the battery charger module 306 and the rechargeable battery module 308. At step 407, the circuitry senses whether the state of charge of the battery included in the rechargeable battery module 308 is greater than another, higher predetermined threshold, for example, 90%. If yes, the battery charger module 306 is turned off. As such, the low voltage loads 311 and the control system 310 are powered only by the rechargeable battery module 308.

Figure 5:
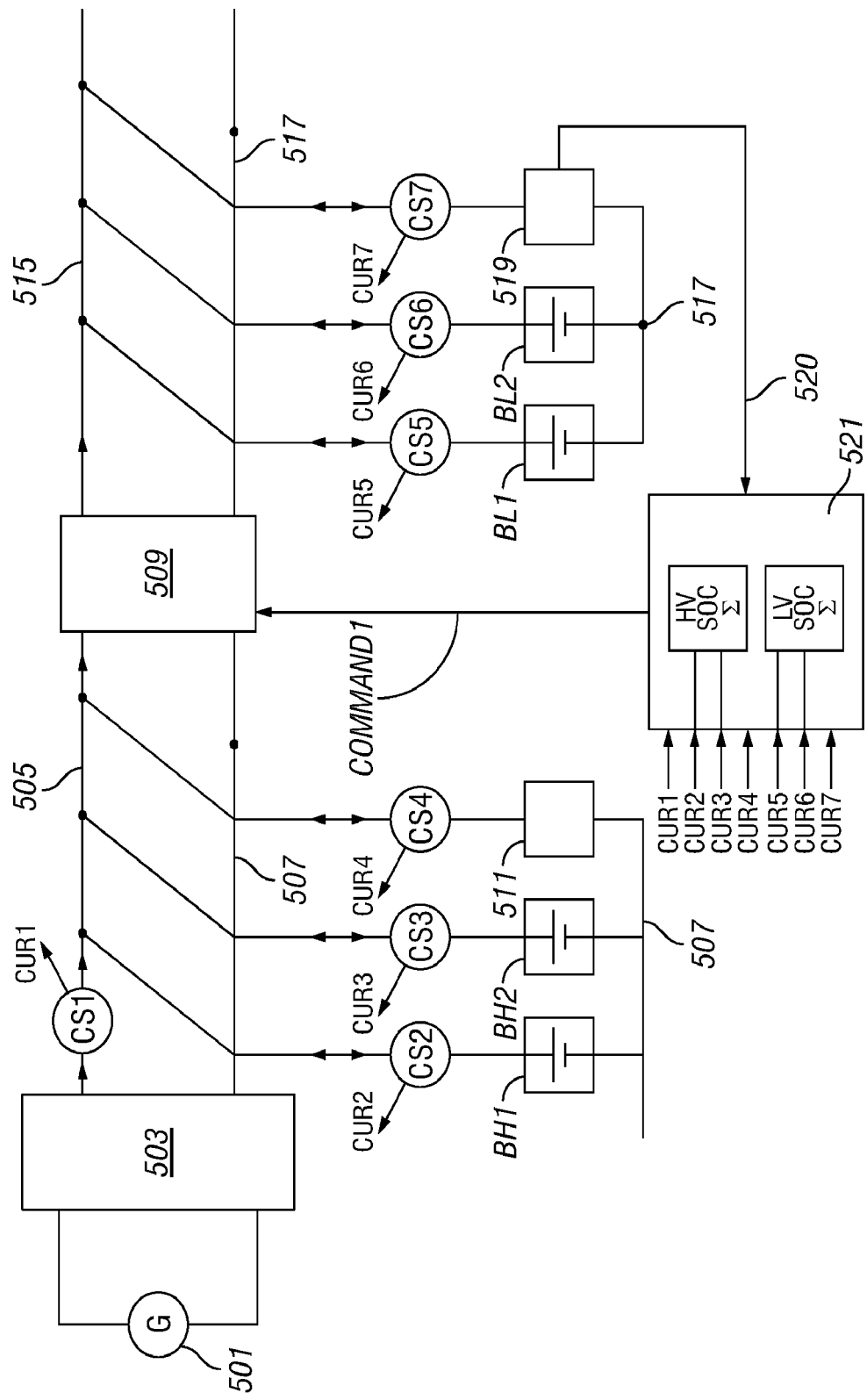
FIG. 5 is a block diagram of another conversion apparatus in accordance with the disclosure, wherein instantaneous currents are sensed to track a battery state of charge.

Turning to FIG. 5, there is shown an AC generator 501, the output of which is fed to a high voltage AC to DC converter 503. The high voltage DC output (e.g., 325 volts) is supplied to the high voltage bus line 505, and its return is ground line 507. For the purpose of illustration, the following components are shown connected to the output of AC to DC converter 503 (i.e., between the high voltage bus line 505 and the ground line 507): (1) a DC to DC converter 509 that may be part of a battery charger module, (2) a first high voltage battery BH1, (3) a second high voltage battery BH2, and (4) high voltage DC loads 511. Note the current (i.e., cur1) supplied from the AC generator 501 to the rest of the conversion system is sensed and measured by means of a current sensor CS1.

The first high voltage battery BH1 and the second high voltage battery BH2 are used as storage elements that can either be charged with current drawn from the output of the AC to DC converter 503 or can alternatively supply current back into the high voltage bus line 505. The current flowing into and out of the first high voltage battery BH1 and the second high voltage battery BH2 (shown by double-headed arrows) is sensed and measured by means of current sensors CS2 and CS3. The high voltage DC loads 511 draw a current which is sensed and measured by means of a current sensor CS4.

The DC to DC converter 509 is designed to be a controllable converter which can be switched on or switched off by a control system 521. The output of DC to DC converter 509 produces the low DC voltage (e.g., 24 volts) which is applied between the low voltage bus line 515 and the ground line 517. For purpose of illustration, the following components are shown connected to the output of DC to DC converter 509 (i.e., between the low voltage bus line 515 and the ground line 517): (1) a first low voltage battery BL1, (2) a second low voltage battery BL2, and (3) low voltage DC loads 519. The first low voltage battery BL1 and the second low voltage battery BL2 may be part of a rechargeable battery module.

The first low voltage battery BL1 and the second low voltage battery BL2 are rechargeable batteries (e.g., lithium-ion batteries) which can either be charged by drawing current from the output of the DC to DC converter 509, or which can alternatively supply current back into the low voltage bus line 515. The current flowing into and out of the first low voltage battery BL1 and the second low voltage battery BL2 (shown by double-headed arrows) is sensed and measured by means of current sensors CS5 and CS6. The low voltage DC loads 519 draw a current which is sensed and measured by means of a current sensor CS7.

In FIG. 5, the DC to DC converter 509 is turned on and off by means of the control system 521 which applies an on-off command signal (com1) to the DC to DC converter 509. Signals cur1-cur7 generated by the corresponding current sensors CS1-CS7 and signal 520 generated by the low voltage DC loads 519 are shown to be fed to the control system 521. These signals are applied to circuitry of the control system 521 (e.g., integrator-operational amplifier, adder-operational amplifier) to determine the state of charge of the first low voltage battery BL1 and/or the second low voltage battery BL2, among other parameters. The control system 521 may include signal processor(s) and programmed circuitry for determining when the state of charge in the first low voltage battery BL1 and/or the second low voltage battery BL2 is below a predetermined threshold, for example, 50%. When the state of charge in the first low voltage battery BL1 or the second low voltage battery BL2 is determined to be below the predetermined threshold, the control system 521 may generate a command signal to the DC to DC converter 509, turning it fully on. The control system 521 may also include signal processor(s) and programmed circuitry for determining when the state of charge in the first low voltage battery BL1 and/or the second low voltage battery BL2 is above another, higher predetermined threshold, for example, 90%. When the state of charge in the first low voltage battery BL1 and the second low voltage battery BL2 is determined to be above the other, higher predetermined threshold, the control system 521 may generate a command signal to the DC to DC converter 509, turning it fully off. Accordingly, the control system 521 may be programmed to recharge the first low voltage battery BL1 and the second low voltage battery BL2, after detecting that any of the first low voltage battery BL1 or the second low voltage battery BL2 is less than 50% charged, and until both batteries are at least 90% charged.

By providing, in the buffered power transfer system shown in FIG. 5, at least one high voltage battery (BH1 and/or BH2) on the high voltage bus line 505 in addition to the at least one low voltage battery (BL1 and/or BL2) on the low voltage bus line 515, the efficiency of the conversion from high DC voltage to low DC voltage may be further increased in cases the power available at the output of the AC to DC converter 503 is not stable enough to recharge the at least one low voltage battery (BL1 and/or BL2).

By way of example, in one application under consideration, about 1 Amp of steady current may be drawn from the low voltage bus line 515 to power the control system 521. During 99% of the time, only 1 Amp of steady current may be drawn. In addition, there may be brief surge periods when the current demand may peak, for example, to 10 Amps to power the low voltage DC loads 519. While another DC to DC converter having a higher capacity than the DC to DC converter 509 (e.g., a DC to DC converter having a power of 1000 Watts) could supply 10 Amps at any time without the need for at least one low voltage battery and/or at least one high voltage battery, this other DC to DC converter would need to be powered continuously. For 99% of the time, this other DC to DC converter would be operating at a low efficiency due to the low current demand. And only for 1% of the time corresponding to the brief surge periods, this other DC to DC converter would be operating at its maximum efficiency. Thus, using the other DC to DC for supplying 10 Amps at any time without the need for at least one low voltage battery and/or at least one high voltage battery results in power losses for a majority of the time.

Rather than running a high power DC to DC converter constantly at low efficiency, the DC to DC converter 509 (e.g., a DC to DC converter having a power of 250 Watts) is only turned on when the state of charge of the low voltage battery BL1 and/or BL2 gets down to 50% of the full capacity, and, when turned on, the DC to DC converter 509 runs at high efficiency. To use the DC to DC converter 509 close to its maximum efficiency, the current generated by the DC to DC converter 509 is stored in a low voltage battery BL1 and/or BL2, which is acting as a buffering "current tank." As such, the DC to DC converter 509 acts as a "current pump" which refill the "current tank."

Operation of the buffered power transfer system shown in FIG. 5 is now described. The low voltage battery BL1 and/or BL2 may be slowly depleted by the control system 521 (e.g., consuming about 200 Watts) and occasionally by the low voltage DC loads 519 (e.g., having a peak consumption of 1000 Watts) during periods when the DC to DC converter 509 is turned off. Only when the state of charge of the low voltage battery BL1 and/or BL2 gets down to, for example, 50% of the full capacity, the control system 521 turns the DC to DC converter 509 on. When turned on, the DC to DC converter 509 runs at high efficiency to recharge the low voltage battery BL1 and/or BL2, to partially power the control system 521, and to partially power the low voltage DC loads 519. Thus, in accordance with an aspect of the disclosure, the DC to DC converter 509 is used on demand (i.e., not running constantly), the current draw from the AC to DC converter 503 is reduced compare to the prior electrical system shown in FIG. 1, and the overall efficiency of a WEC is improved as well.

In FIG. 5, the state of charge of the batteries is calculated from measurements of current flows supplied to and drained from the batteries or other components. A state of charge may then be estimated by continuously summing the instantaneous current flows over time. For example, the current flowing into a battery is a positive contribution that charges the battery, while current flowing from the battery is a negative contribution that discharges the battery. The state of charge of the battery may be tracked in the unit of "Amp Hours" which is the multiplication of current and duration. Note that while Amp Hours may be a standard unit of measurement, other units may alternatively be used.

The various current flows are measured using current sensors CS2-CS3, or CS5-CS6, installed between the batteries and the high voltage bus line 505 or the low voltage bus line 515. The currents may be typically sampled every 0.1 seconds. By way of example, if the AC to DC converter 503 supplies 10 Amps for 0.1 seconds to the high voltage battery BH1, then it has filled the high voltage battery BH1 with 0.0002778 Amp Hours during that small amount of time. On the other hand, if the high voltage DC loads 511 were to draw 10 Amps for 0.1 seconds from the high voltage battery BH1, it would decrease the energy stored in the high voltage battery BH1 by 0.0002778 Amp Hours. The example above used 0.1 second as a sample rate; 0.1 second divided by 3600 seconds per hour=0.00002778 Hours. This number times 10 Amps gives 0.0002778 Amp Hours.

Accordingly, integration circuitry or an algorithm programmed in a processor in the control system 521 may be used to continually sum the measurements signals generated by the current sensors CS1-CS7, and thus determine the state of charge of the batteries BH1, BH2, CL1 or CL2.

Other means may be used for sensing or tracking the state of charge. For example, an external sensor attached to the batteries may be used to measure the state of charge.

While the disclosure is susceptible to various modifications and alternative forms, specific embodiments thereof are shown by way of example in the drawings and description. It should be understood, however, that the drawings and detailed description thereto are not intended to limit the claims to the particular form disclosed, but on the contrary, the intention is to cover all modifications, equivalents, and alternatives falling within the scope of the claims.

What is claimed is:

1. An apparatus for converting high DC voltage to low DC voltage comprising:
   a battery charger module including a DC to DC converter, wherein the DC to DC converter has a high voltage input and a low voltage output;
   a rechargeable battery module including a low voltage battery and a sensor capable of generating a signal indicative of a state of charge of the low voltage battery, wherein the rechargeable battery module is connected to the low voltage output of the battery charger module; and
   a control system receiving the signal indicative of the state of charge of the low voltage battery and generating a control signal to the rechargeable battery module, the control system being configured to activate the battery charger module with the control signal upon detecting that the state of charge of the low voltage battery is below a first predetermined threshold, and to deactivate the battery charger module with the control signal upon detecting that the state of charge of the low voltage battery is above a second predetermined threshold, wherein the second predetermined threshold is larger than the first predetermined threshold,
   wherein the DC to DC converter of the battery charger module does not generate power loss when the rechargeable battery module is deactivated.

2. The apparatus of claim 1 further comprising a low voltage load connected to the rechargeable battery module, the low voltage load consuming a variable electrical power characterized by a peak electrical power that is higher than an average electrical power, and wherein an electrical power capacity of the DC to DC converter is strictly lower than the peak electrical power of the low voltage load.

3. The apparatus of claim 1 further comprising:
   an electric generator that produces a varying AC voltage from wave energy;
   an AC to DC converter connected to the electric generator; and
   a high voltage storage element including a high voltage battery that is connected to the AC to DC converter and to the high voltage input of the battery charger module.

4. The apparatus of claim 1, wherein the control system is continuously powered from the rechargeable battery module.

5. The apparatus of claim 1, wherein the sensor capable of generating the signal indicative of the state of charge of the low voltage battery includes a current sensor, and wherein the control system includes integration circuitry to continually sum the signal generated by the current sensor.

6. The apparatus of claim 1, or wherein the sensor capable of generating the signal indicative of the state of charge of the low voltage battery includes a current sensor, and wherein the control system includes a processor programmed to continually sum the signal generated by the current sensor.

7. The apparatus of claim 1, wherein the low voltage battery of the rechargeable battery module includes a lithium-ion battery.

8. A method comprising:
   converting high DC voltage to low DC voltage with a DC to DC converter included in a battery charger module;
   recharging a low voltage battery included in a rechargeable battery module with the low DC voltage;
   generating a signal indicative of a state of charge of the low voltage battery with a sensor included in the rechargeable battery module;
   using a control system to receive the signal indicative of the state of charge of the low voltage battery and to generate a control signal to the rechargeable battery module;
   activating the battery charger module upon detecting that the state of charge of the low voltage battery is below a first predetermined threshold; and
   deactivating the battery charger module upon detecting that the state of charge of the low voltage battery is above a second predetermined threshold, wherein the second predetermined threshold is larger than the first predetermined threshold, wherein the DC to DC converter of the battery charger module does not generate power loss when the rechargeable battery module is deactivated.

9. The method of claim 8, further comprising:
   consuming a variable electrical power with a low voltage load connected to the rechargeable battery module, wherein the low voltage load is characterized by a peak electrical power that is higher than an average electrical power, and
   producing, with the DC to DC converter, an electrical power that is strictly lower than the peak electrical power of the low voltage load.

10. The method of claim 8, further comprising continuously powering the control system from the rechargeable battery module.

11. The method of claim 8, further comprising:
    producing, with an electric generator, a varying AC voltage from wave energy;
    converting the varying AC voltage to a DC voltage using an AC to DC converter connected to the electric generator; and
    charging a high voltage battery included in a high voltage storage element that is connected to an output of the AC to DC converter; and
    supplying current from the high voltage battery included in the high voltage storage element to an input of the battery charger module.

12. The method of claim 8, wherein generating the signal indicative of the state of charge of the low voltage battery includes measuring a current flow to the low voltage battery, the method further comprising continually summing the current flow to determine the state of charge of the low voltage battery.

* * * * *

UNITED STATES PATENT AND TRADEMARK OFFICE
CERTIFICATE OF CORRECTION

Page 1 of 2

PATENT NO. : 10,938,232 B2
APPLICATION NO. : 16/348668
DATED : March 2, 2021
INVENTOR(S) : Joseph Sarokhan It is certified that error appears in the above-identified patent and that said Letters Patent is hereby corrected as shown below:

In the Specification

In Column 2, Line 2, "when the rechargeable battery module is deactivated" should read --when the battery charger module is deactivated--.

In Column 2, Lines 24-25, "a control signal to the rechargeable battery module" should read --a control signal to the battery charger module--.

In Column 3, Lines 4-5, "when the rechargeable battery module is deactivated" should read --when the battery charger module is deactivated--.

In Column 3, Lines 22-23, "a control signal to the rechargeable battery module" should read --a control signal to the battery charger module--.

In Column 5, Lines 55-56, "battery charger module 306 may then recharge the battery charger module 306 using electric electrical power" should read --battery charger module 306 may then recharge the rechargeable battery module 308 using electric power--.

In the Claims

In Column 9, Claim 1, Line 14, "a control signal to the rechargeable battery module," should read --a control signal to the battery charger module--.

In Column 9, Claim 1, Lines 25-26, "when the rechargeable battery module is deactivated" should read --when the battery charger module is deactivated--.

In Column 10, Claim 8, Lines 11-12, "a control signal to the rechargeable battery module," should read --a control signal to the battery charger module--.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*

In Column 10, Claim 8, Lines 22-23, "when the rechargeable battery module is deactivated" should read --when the battery charger module is deactivated--.